(12) United States Patent
O'Connor et al.

(10) Patent No.: US 7,558,733 B2
(45) Date of Patent: Jul. 7, 2009

(54) SYSTEM AND METHOD FOR DIALOG CACHING

(75) Inventors: Brian T. O'Connor, Millis, MA (US); Yoryos Yeracaris, Boston, MA (US); Robert Eric Genter, Arlington, MA (US); Jonathan M. Abbett, Brookline, MA (US); Ara Kouchakdjian, Sudbury, MA (US)

(73) Assignee: Silverlink Communications, Inc., Burlington, MA (US)

( * ) Notice: Subject to any disclaimer, the term of this patent is extended or adjusted under 35 U.S.C. 154(b) by 704 days.

(21) Appl. No.: 11/216,450

(22) Filed: Aug. 31, 2005

(65) Prior Publication Data

US 2006/0062360 A1 Mar. 23, 2006

Related U.S. Application Data

(60) Provisional application No. 60/606,159, filed on Aug. 31, 2004.

(51) Int. Cl.
*G10L 13/08* (2006.01)
(52) U.S. Cl. .................. 704/260; 704/88.04; 704/88.13
(58) Field of Classification Search .................. 704/260
See application file for complete search history.

(56) References Cited

U.S. PATENT DOCUMENTS

| 7,143,040 | B2 * | 11/2006 | Durston et al. ............... 704/270 |
| 2004/0215460 | A1 * | 10/2004 | Cosatto et al. ............... 704/260 |
| 2004/0218045 | A1 * | 11/2004 | Bodnar et al. ............. 348/207.1 |
| 2004/0225499 | A1 * | 11/2004 | Wang et al. .................. 704/257 |
| 2005/0043953 | A1 * | 2/2005 | Winterkamp et al. ......... 704/275 |
| 2005/0069122 | A1 * | 3/2005 | Lin ........................ 379/265.01 |
| 2005/0135571 | A1 * | 6/2005 | Bangalore et al. ......... 379/88.01 |

* cited by examiner

*Primary Examiner*—Creighton Smith
(74) *Attorney, Agent, or Firm*—Duane Morris LLP

(57) ABSTRACT

A system for providing efficient data handling for automated dialogs and the resulting data is disclosed. The system for providing efficient data handling for automated dialogs and the resulting data includes a data provider, a dialog, a dialog delivery system suitable for delivering the dialog based on data from the data provider, and, a interactor suitable for interaction with the dialog delivered by the dialog delivery system, wherein the interactor provides dialog feedback efficiently stored locally until completion of the dialog and upon completion transmits the feedback to the dialog delivery system.

23 Claims, 1 Drawing Sheet

SYSTEM AND METHOD FOR DIALOG CACHING

RELATED APPLICATION

This application claims priority to U.S. patent application Ser. No. 60/606,159, filed Aug. 31, 2004, the entire disclosure of which is hereby incorporated by reference as if being set forth in its entirety herein.

BACKGROUND OF THE INVENTION

1. Field of the Invention

The present invention is related to the field of dialog creation and execution, and, more specifically, to a system and method for dialog caching.

2. Background of the Invention

Companies frequently need to communicate with millions of customers, hereinthroughout also referred to as recipients. Methods used to develop messages intended to reach this recipient population historically were manual in nature. Over time, certain automated technologies emerged that automated these types of communications, including bulk mailing, IVR (Interactive Voice Response), and, more recently, Web technology and email.

IVR technology enabled automated and interactive dialogs between companies and customers. Interactive Voice Response (IVR) systems were developed in the 1960s. The first IVR systems allowed a recipient to call a number, be presented with voice prompts, and enter data in response to those prompts using the dial on the telephone.

A number of innovations followed, including the use of dual-tone multifrequency (DTMF) tones for providing recipient input, and integration with speech synthesis mechanisms that combined pre-recorded words into phrases. Initially IVR systems were standalone systems. Over time, IVR capabilities were added to PBXes, and eventually to central office switches.

Speech recognition capabilities eventually progressed to the point where speech recognition could be successfully integrated with IVR systems to provide recipients with a more "natural" means by which to interact with a system in simple scenarios, such as wherein yes/no answers would suffice. Eventually, computers have become sufficiently powerful that general word recognition may be used in IVR systems.

Professional services have been offered to develop applications that allowed enterprises to accept calls from recipients, and to guide those recipients through increasingly complex transactions. Enterprises now provide a wide range of services to recipients without the recipient ever having to interact with a human operator. However, the development of IVR systems currently requires technically knowledgeable computer programmers to build interactive dialogs and to integrate those dialogs into an operating telephony delivery environment.

Automated dialog creation usually involves detailed and laborious programming. Often this involves programmatically linking different technologies through computer programming, and building decision logic and scheduling algorithms, in a piece-meal mode. This may require multiple individuals with different technical domain knowledge (i.e. telephony, IVR development, Web development, database development). Although progress has been made to reduce the time it takes to develop and deploy such systems, this process remains inflexible, complex, and therefore expensive.

VXML, short for Voice Extensible Markup Language, allows a user to interact with the Internet through voice-recognition technology, and has helped alleviate some of the problems of the complexities involved in programming for voice systems. Instead of a traditional browser, which relies on a combination of interactions with HTML via a keyboard and mouse, VXML relies on a voice browser and/or the telephone. VoiceXML builds a voice application without reliance upon proprietary techniques, but rather leverages the standards-based infrastructure similar to the standards-based infrastructure used to build Web sites. Using VXML, the user may interact with a voice browser by, for example, listening to audio output that is pre-recorded or computer-synthesized, and may submit audio input through the user's natural speaking voice, or through a keypad, such as a telephone. Applying a standard to the development of speech applications has allowed increased efficiencies in programming and speed of implementation, but has not unburdened the paradigm of development, i.e. the programmer.

However, even in light of the advances discussed hereinabove, the automated dialogs systems currently available fail to provide a system and method for enabling business users to develop computer code to generate and deploy interactive dialogs through an easy-to-use graphic user interface, that can be delivered by different media types (calls, Web pages, letter surveys, text), a system and method for enabling a business user to control the level of authentication required in order to deliver a given interactive dialog, a system and method for defining visually the content of an automated dialog, a scheduling and resource allocation mechanism that enables the system to place scheduled dialogs according to the availability of resources, a policy engine enabling the business user to prescribe what action the system should take should the recipient not be reached and to prescribe how many recipients should be contacted at a time, and a transactional data collection and display mechanism.

Therefore, the need exists for a system and method of reducing traffic and providing more efficient data handling for automated dialogs and the resulting data.

BRIEF DESCRIPTION OF THE DRAWINGS

Understanding of the present invention will be facilitated by consideration of the following detailed description of the present invention taken in conjunction with the accompanying drawings, in which like numerals refer to like parts.

DETAILED DESCRIPTION

Figure 1:
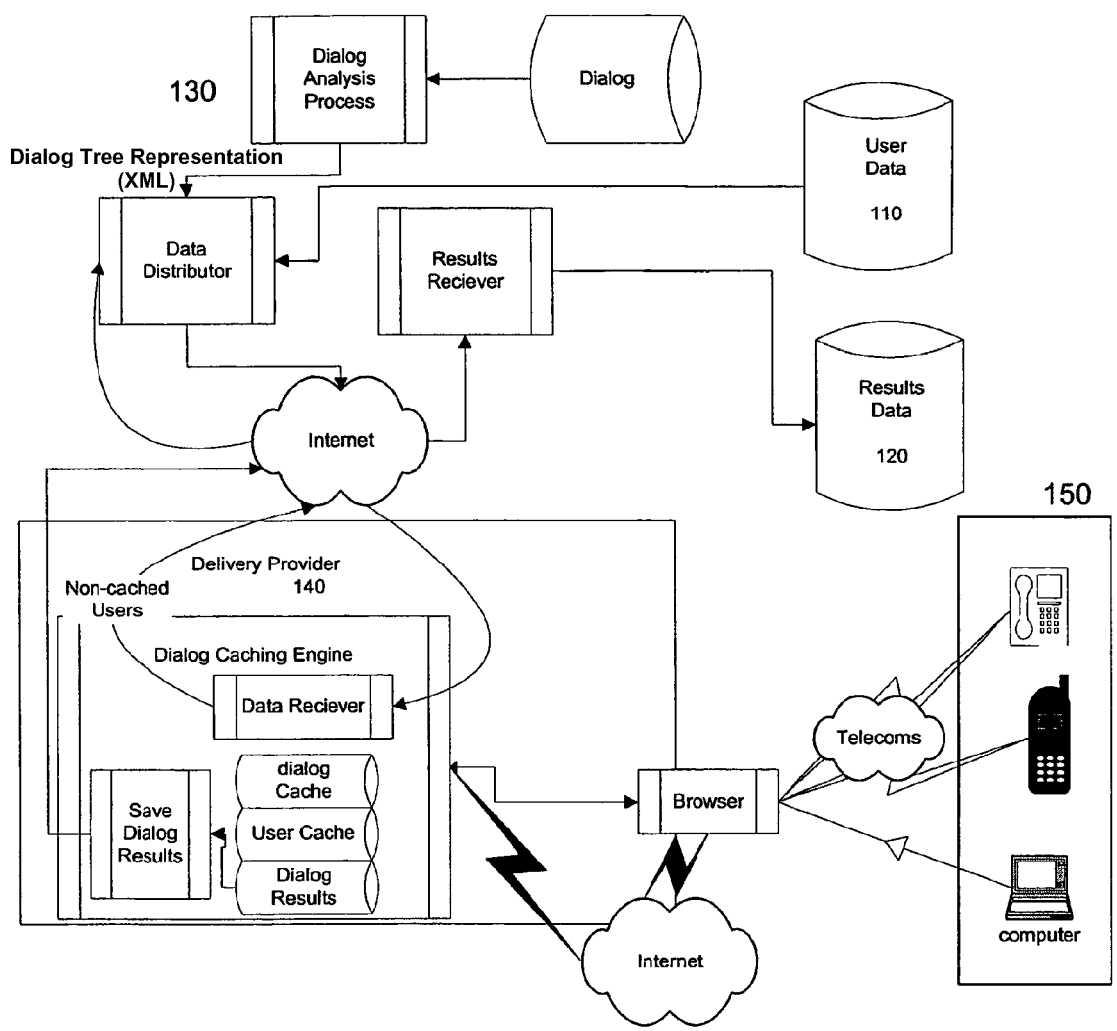
FIG. 1 is a diagrammatic illustration of the system utilized according to an aspect of the present invention.

It is to be understood that the figures and descriptions of the present invention have been simplified to illustrate elements that may be relevant for a clear understanding of the present invention, while eliminating, for purposes of clarity, many other elements found in a typical information device, apparatus, system, and method. Those of ordinary skill in the art will recognize that other elements may be desirable and/or required in order to implement the present invention. But because such elements are well known in the art, and because they do not facilitate a better understanding of the present invention, a discussion of such elements is not provided herein. The disclosure herein is directed to all such variations and modifications to the applications, networks, systems and methods disclosed herein and as will be known, or apparent, to those skilled in the art. Further, the present invention may be illustratively described herein throughout, however, those skilled in the art will recognize, in light of the disclosure herein, that the present invention may be beneficially employed in caching dialogs.

Referring to FIG. 1 there is shown diagrammatic illustration of system 100 utilized according to an aspect of the present invention. System 100 may include a user data 110, a results data 120, a dialog subsystem 130, a delivery provider 140, and at least one interaction device 150. According to an aspect of the present invention, delivery provider 140 may transmit dialogs created in dialog subsystem 130 to at least one interaction device 150. Further, the response or responses provided by, on, or with at least one interaction device 150 may be transmitted by delivery provider 140 and dialog subsystem 130 as results data 120.

User data 110 may include information on the dialog to be presented, information on the individual that the dialog is presented to, and other information pertinent as would be known to those possessing an ordinary skill in the pertinent arts.

Results data 120 may include the result of the posited dialog questions. This often is the result of the dialog and analysis may be performed on results data 120.

Dialog subsystem 130 may include a data distributor designed to transmit data. Data distributor may be formulated in any language known to those possessing an ordinary skill in the pertinent arts, such as XML, for example. The data distributor may be used to determine when and what user data is sent to the dialog caching engine. The data distributor may send user data to alternate dialog caching engines, as necessary, and as desired according to an aspect of the present invention.

Dialog subsystem 130 may include a dialog analysis process. This process may be used to analyze the possible paths within a dialog by traversing a dialog, written in HTML, VXML, SALT, or other similar programming languages. The dialog analysis process may result in a tree representation of the dialog identifying paths and logic associated with decisions within the tree, similar to a flow diagram. A one-to-one or unique relationship may exist between dialogs and associated trees. Such trees may be represented by data in a XML format.

Delivery provider 140 may include a dialog caching engine which may include a user cache, a data receiver, a dialog cache, a dialog results, and a dialog result savor.

User cache may include information or data in a structure. This data may include information required to complete the dialog associated with a particular individual. Such a data structure may take the form of XML formatted data. Other formats may also be utilized as would be evident to one possessing an ordinary skill in the pertinent arts.

Non-cached users may also be encountered. For individuals without information resident in the user cache, searches may be performed using a unique identifier or other mechanism known to those possessing an ordinary skill in the pertinent arts. Such a search may require querying dialog caching engine and user data such as through the internet or local network for example. Upon user identification the system transmits user data to the dialog caching engine.

Data receiver may receive user data or dialog data and may include a mechanism to store the data within the dialog caching engine. Dialog caching engine may be utilized to substitute variables and decide how to present a dialog and what dialog to present. Dialog caching engine may receive data associated with the defined dialog and the user prior to dialog execution. Data may be delivered to the dialog caching engine using methods known to those possessing an ordinary skill in the pertinent arts, such as, but not limited to TCP/IP, SSL, http, industry standard communications protocol, or prior interaction with a user. Data may be provided back to the dialog caching engine by a user. Such data may influence the next dialog path in the tree to be presented or displayed. Data may be passed from page to page within the dialog and may be represented by an ordered pair specifically matching or linking the question and the answer or value from the user. Such pairs may be recorded during the dialog execution within the dialog caching engine to be transmitted to a dialog result savor upon completion or at a later time.

According to an aspect of the present invention, a browser may be used to run cached pages such as those stored or cached on the internet in formats such as HTML, VXML, or SALT, for example. This interaction between the browser and caching engines may reduce traffic on the internet as the number of nodes that require navigation may be reduced. Caching engines may reside local to the delivery provider, thus eliminating internet traffic between the dialog web server and the delivery provider.

The dialog caching engine may enable user interaction between the browser and the content caching engine and the browser and the dialog caching engine, by way of non-limiting examples only.

Data collected within a dialog according to an aspect of the present invention may be passed between pages by a browser, and as a result may remain local to the dialog caching engine. According to an aspect of the present invention, the dialog may operate by waiting for dialog completion to occur and then sending the information to a central database. As may be evident to those possessing an ordinary skill in the pertinent arts, this timing may be altered to perform or maximize certain variables while increasing the bandwidth of data transfer. By sending the data at the completion of the dialog, data may be resent without the loss of information or slowing of the running of the dialog, in response to a internet outage, for example.

At least one interaction device 150 may include any interaction device known to those possessing an ordinary skill in the pertinent arts, such as, but not limited to, telephone, answering machine, voice mail, including cell phones, and computers, and may be provided information and interaction may occur via voice, data, web and internet and short message service, or other means known to those possessing an ordinary skill in the pertinent arts.

For example, a telephone delivery may be provided and a telephone utilized as at least one interaction device 150. In such a configuration telephone delivery may have associated a level of functionality, including such functionality as VXML, SALT, speech recognition, text to speech, audio files, and concurrent call capabilities.

Alternatively, or additionally, a web delivery may be provided and a computer utilized as at least one interaction device 150. In such a configuration, the provider may be an ISP, or hosted website, and may include content caching to act as a proxy for a connection from an external site.

Further, an SMS delivery may be provided utilizing the ability to send and receive text messages.

One skilled in the art might implement the present invention by using readily available hardware and software techniques, in accordance with the teachings set forth herein and the references referred to herein and incorporated into this disclosure. Further, any of a variety of computing aspects, languages, or scripts, including XML, may be incorporated into the present invention.

Those of ordinary skill in the art may recognize that many modifications and variations of the present invention may be implemented without departing from the spirit or scope of the invention. Thus, it is intended that the present invention covers the modifications and variations of this invention provided they come within the scope of the appended claims and their equivalents.

What is claimed is:

1. A system for providing efficient data handling for automated dialogs and the resulting data, said system comprising:
   a data provider;
   a dialog;
   a dialog delivery system suitable for delivering said dialog by interacting with at least one subject based on data from said data provider; and,
   an interactor suitable for interaction with said dialog delivered by said dialog delivery system, wherein feedback resulting from interacting with the subject according to the dialog is efficiently stored locally until completion of said dialog and upon completion the interactor transmits the dialog feedback to said dialog delivery system.

2. The system of claim 1, wherein said data includes information on said dialog to be presented.

3. The system of claim 1, wherein said data includes information on the individual that said dialog is presented to.

4. The system of claim 1, wherein said dialog feedback includes results determined at least partly by dialog questions posited to the subject according to the dialog.

5. The system of claim 1, wherein said dialog delivery system includes a data distributor designed to transmit data.

6. The system of claim 5, wherein said data distributor is formulated in XML.

7. The system of claim 5, wherein said data distributor is used to determine when and what data is transmitted.

8. The system of claim 1, wherein said dialog delivery system includes a dialog analysis processor.

9. The system of claim 8, wherein said dialog analysis processor analyzes the possible paths within said dialog.

10. The system of claim 9, wherein said possible paths are analyzed by traversing said dialog.

11. The system of claim 8, wherein said dialog analysis processor provides a tree representation of said dialog identifying paths and logic associated with decisions within the tree.

12. The system of claim 8, wherein said dialog analysis processor provides a flow diagram.

13. The system of claim 11, wherein a unique relationship exists between said dialog and the associated tree.

14. The system of claim 13, wherein the associated tree is represented by data in a XML format.

15. The system of claim 1, further comprising a delivery provider.

16. The system of claim 15, wherein said delivery provider includes a dialog caching engine.

17. The system of claim 16, wherein said dialog caching engine includes a user cache, a data receiver, a dialog cache, a dialog results, and a dialog result saver.

18. The system of claim 17, wherein said user cache includes data in a structure.

19. The system of claim 18, wherein said data in the structure includes information required to complete the dialog associated with a particular individual.

20. The system of claim 17, wherein said data receiver receives at least one of user data and dialog data.

21. The system of claim 17, wherein said data receiver includes a mechanism to store the data within the dialog caching engine.

22. The system of claim 16, wherein said dialog caching engine is utilized to substitute variables and decide how to present a dialog and what dialog to present.

23. The system of claim 16, wherein said dialog caching engine receives data associated with said dialog and the user prior to dialog execution.

* * * * *